United States Patent
Chen et al.

(10) Patent No.: US 12,179,204 B2
(45) Date of Patent: *Dec. 31, 2024

(54) SAMPLE WELL FABRICATION TECHNIQUES AND STRUCTURES FOR INTEGRATED SENSOR

(71) Applicant: Quantum-Si Incorporated, Branford, CT (US)

(72) Inventors: Guojun Chen, Sherborn, MA (US); James Beach, Austin, TX (US); Kathren Fink Croce, West Haven, CT (US); Jeremy Lackey, Guilford, CT (US); Gerard Schmid, Guilford, CT (US)

(73) Assignee: Quantum-Si Incorporated, Branford, CT (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/580,877

(22) Filed: Sep. 24, 2019

(65) Prior Publication Data

US 2020/0171484 A1 Jun. 4, 2020

Related U.S. Application Data

(60) Provisional application No. 62/774,673, filed on Dec. 3, 2018.

(51) Int. Cl.
*G02B 6/136* (2006.01)
*B01L 3/00* (2006.01)
(Continued)

(52) U.S. Cl.
CPC .............. *B01L 3/508* (2013.01); *G02B 6/132* (2013.01); *G02B 6/136* (2013.01);
(Continued)

(58) Field of Classification Search
CPC ...... B01L 3/508; B01L 3/5085; B01L 3/5088; B01L 2300/0636; B01L 2300/0851;
(Continued)

(56) References Cited

U.S. PATENT DOCUMENTS 5,118,382 A 6/1992 Cronin et al.
5,961,924 A 10/1999 Reichert et al.
(Continued)

FOREIGN PATENT DOCUMENTS

CN 105609471 A 5/2016
CN 112955401 A 6/2021
(Continued)

OTHER PUBLICATIONS

Hale, Fibre Optic Sensors using Adiabatically Tapered Single Mode Fibres. Dissertation submitted to the University of Cambridge. Feb. 1994. 209 pages.
(Continued)

*Primary Examiner* — Jill A Warden
*Assistant Examiner* — Dwayne K Handy
(74) *Attorney, Agent, or Firm* — Wolf, Greenfield & Sacks, P.C.

(57) ABSTRACT

A method of forming an integrated device includes forming a sample well within a cladding layer of a substrate; forming a sacrificial spacer layer over the substrate and into the sample well; performing a directional etch of the sacrificial spacer layer so as to form a sacrificial sidewall spacer on sidewalls of the sample well; forming, over the substrate and into the sample well, a functional layer that provides a location for attachment of a biomolecule; and removing the sacrificial spacer material.

32 Claims, 10 Drawing Sheets

(51) Int. Cl.
*G02B 6/132* (2006.01)
*G02B 6/12* (2006.01)

(52) U.S. Cl.
CPC ... *B01L 2200/12* (2013.01); *B01L 2300/0851* (2013.01); *B01L 2300/0858* (2013.01); *B01L 2300/0887* (2013.01); *B01L 2300/12* (2013.01); *G02B 2006/12138* (2013.01)

(58) Field of Classification Search
CPC .... B01L 2300/0887; B01J 2219/00317; G01B 6/132; G01B 6/136
See application file for complete search history.

(56) References Cited

U.S. PATENT DOCUMENTS

| | | |
|---|---|---|
| 6,787,308 B2 | 9/2004 | Balasubramanian et al. |
| 6,917,726 B2 | 7/2005 | Levene et al. |
| 7,175,811 B2 | 2/2007 | Bach et al. |
| 7,426,322 B2 | 9/2008 | Hyde |
| 7,738,086 B2 | 6/2010 | Shepard et al. |
| 7,820,983 B2 | 10/2010 | Lundquist et al. |
| 7,834,329 B2 | 11/2010 | Lundquist et al. |
| 7,838,847 B2 | 11/2010 | Lundquist et al. |
| 8,053,742 B2 | 11/2011 | Lundquist et al. |
| 8,207,509 B2 | 6/2012 | Lundquist et al. |
| 8,274,040 B2 | 9/2012 | Zhong et al. |
| 8,278,728 B2 | 10/2012 | Murshid |
| 8,465,699 B2 | 6/2013 | Fehr et al. |
| 8,471,219 B2 | 6/2013 | Lundquist et al. |
| 8,471,230 B2 | 6/2013 | Zhong et al. |
| 8,502,169 B2 | 8/2013 | Rigneault et al. |
| 8,618,507 B1 | 12/2013 | Lundquist et al. |
| 9,029,802 B2 | 5/2015 | Lundquist et al. |
| 9,157,864 B2 | 10/2015 | Fehr et al. |
| 9,222,123 B2 | 12/2015 | Zhong et al. |
| 9,222,133 B2 | 12/2015 | Lundquist et al. |
| 9,223,084 B2 | 12/2015 | Grot et al. |
| 9,372,308 B1 | 6/2016 | Saxena et al. |
| 9,587,276 B2 | 3/2017 | Lundquist et al. |
| 9,606,060 B2 | 3/2017 | Chen et al. |
| 9,658,161 B2 | 5/2017 | Saxena et al. |
| 9,666,748 B2 | 5/2017 | Leobandung |
| 9,719,138 B2 | 8/2017 | Zhong et al. |
| 9,765,395 B2 | 9/2017 | Goldsmith |
| 9,946,017 B2 | 4/2018 | Saxena et al. |
| 10,018,764 B2 | 7/2018 | Grot et al. |
| 10,090,429 B2 | 10/2018 | Leobandung |
| 10,138,515 B2 | 11/2018 | Fehr et al. |
| 10,280,457 B2 | 5/2019 | Zhong et al. |
| 10,310,178 B2 | 6/2019 | Saxena et al. |
| 10,487,356 B2 | 11/2019 | Lundquist et al. |
| 10,578,788 B2 | 3/2020 | Grot et al. |
| 10,655,172 B2 | 5/2020 | Rank et al. |
| 10,724,090 B2 | 7/2020 | McCaffrey et al. |
| 11,322,413 B2 | 5/2022 | Schmid et al. |
| 2002/0182716 A1 | 12/2002 | Weisbuch et al. |
| 2003/0174992 A1 | 9/2003 | Levene et al. |
| 2010/0065726 A1 | 3/2010 | Zhong et al. |
| 2011/0257040 A1 | 10/2011 | Turner et al. |
| 2013/0116153 A1 | 5/2013 | Bowen et al. |
| 2015/0141267 A1 | 5/2015 | Rothberg et al. |
| 2016/0084761 A1 | 3/2016 | Rothberg et al. |
| 2017/0146479 A1 | 5/2017 | Levine et al. |
| 2017/0350818 A1 | 12/2017 | Rothberg et al. |
| 2018/0326412 A1* | 11/2018 | Rothberg ............. C09D 171/02 |
| 2019/0292590 A1 | 9/2019 | Zhong et al. |
| 2020/0075426 A1 | 3/2020 | Schmid et al. |
| 2022/0238389 A1 | 7/2022 | Schmid et al. |

FOREIGN PATENT DOCUMENTS

| | | |
|---|---|---|
| JP | H04-340721 A | 11/1992 |
| JP | H05-507813 A | 11/1993 |
| JP | H07-326618 A | 12/1995 |
| JP | 2005-345353 A | 12/2005 |
| JP | 2006-344884 A | 12/2006 |
| JP | 2012-509577 A | 4/2012 |
| JP | 2017-525958 A | 9/2017 |
| JP | 2018-521308 A | 8/2018 |
| TW | I534431 B | 5/2016 |
| TW | 201802454 A | 1/2018 |
| WO | WO 2011/153962 A1 | 12/2011 |
| WO | WO 2018/204810 A1 | 11/2018 |

OTHER PUBLICATIONS

Mogensen et al., A Microfluidic Device with an Integrated Waveguide Beam Splitter for Velocity Measurements of Flowing Particles by Fourier Transformation. Analytical Chemistry. Sep. 15, 2003;75(18):4931-4936.

Taitt et al., Evanescent wave fluorescence biosensors. Biosens Bioelectron. Jun. 2005;20(12):2470-87. Epub Dec. 8, 2004.

Invitation to Pay Additional Fees mailed Jan. 13, 2020 for International Application No. PCT/US2019/052994.

International Search Report and Written Opinion mailed Mar. 19, 2020 for International Application No. PCT/US2019/052994.

International Search Report and Written Opinion mailed Nov. 22, 2019 for International Application No. PCT/US2019/048836.

Laermer, Micromachining Technologies in MEMS. In: Handbook of Silicon Based MEMS Materials and Technologies. Sep. 2015. Deans. Part IV:452.

U.S. Appl. No. 16/555,902, filed Aug. 29, 2019, Schmid et al..

PCT/US2019/052994, Jan. 13, 2020, Invitation to Pay Additional Fees.

PCT/US2019/052994, Mar. 19, 2020, International Search Report and Written Opinion.

PCT/US2019/048836, Nov. 22, 2019, International Search Report and Written Opinion.

\* cited by examiner

SAMPLE WELL FABRICATION TECHNIQUES AND STRUCTURES FOR INTEGRATED SENSOR

RELATED APPLICATIONS

This application claims priority under (35 USC 119(e)) to provisional application U.S. Application Ser. No. 62/774,673, filed Dec. 3, 2018, entitled "SAMPLE WELL FABRICATION TECHNIQUES AND STRUCTURES FOR INTEGRATED SENSOR DEVICES".

BACKGROUND

The present disclosure relates generally to biological sequencing and, more specifically to sample well fabrication techniques and associated structures for integrated sensor devices that may be used in conjunction with sequencing machines.

Sequencing of nucleic acids (e.g., deoxyribonucleic acid (DNA), ribonucleic acid (RNA)) includes identifying individual nucleotides in a target nucleic acid. Some nucleic acid sequencing methods include identifying individual nucleotides as they are incorporated into a nucleic acid strand complementary to the target nucleic acid. The series of nucleotides for the complementary strand identified during the sequencing process may then allow for identification of the nucleotide sequence for the target nucleic acid strand.

Detection and analysis of biological samples may be performed using biological assays ("bioassays"). Bioassays conventionally involve large, expensive laboratory equipment requiring research scientists trained to operate the equipment and perform the bioassays. Moreover, bioassays are conventionally performed in bulk such that a large amount of a particular type of sample is necessary for detection and quantitation.

Some bioassays are performed by tagging samples with luminescent markers that emit light of a particular wavelength. The markers are illuminated with a light source to cause luminescence, and the luminescent light is detected with a photodetector to quantify the amount of luminescent light emitted by the markers. Bioassays using luminescent markers conventionally involve expensive laser light sources to illuminate samples and complicated luminescent detection optics and electronics to collect the luminescence from the illuminated samples.

SUMMARY

In one aspect, a method of forming an integrated device includes forming a sample well within a cladding layer of a substrate; forming a sacrificial spacer layer over the substrate and into the sample well; performing a directional etch of the sacrificial spacer layer so as to form a sacrificial sidewall spacer on sidewalls of the sample well; forming, over the substrate and into the sample well, a functional layer that provides a location for attachment of a biomolecule; and removing the sacrificial spacer material.

In another aspect, an integrated device includes a cladding layer; a metal stack formed on the cladding layer, the metal stack having a first metal layer and a second metal layer; a sample well formed through the metal stack and into at least a portion of the cladding layer, the sample well having sidewalls and a bottom surface comprising a same material; an encapsulating spacer material filling an undercut region of at least one of the first and second metal layers; and a biotin functional moiety selectively formed only on the bottom surface of the sample well, the biotin functional moiety configured for attachment of a biomolecule thereto.

BRIEF DESCRIPTION OF THE DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
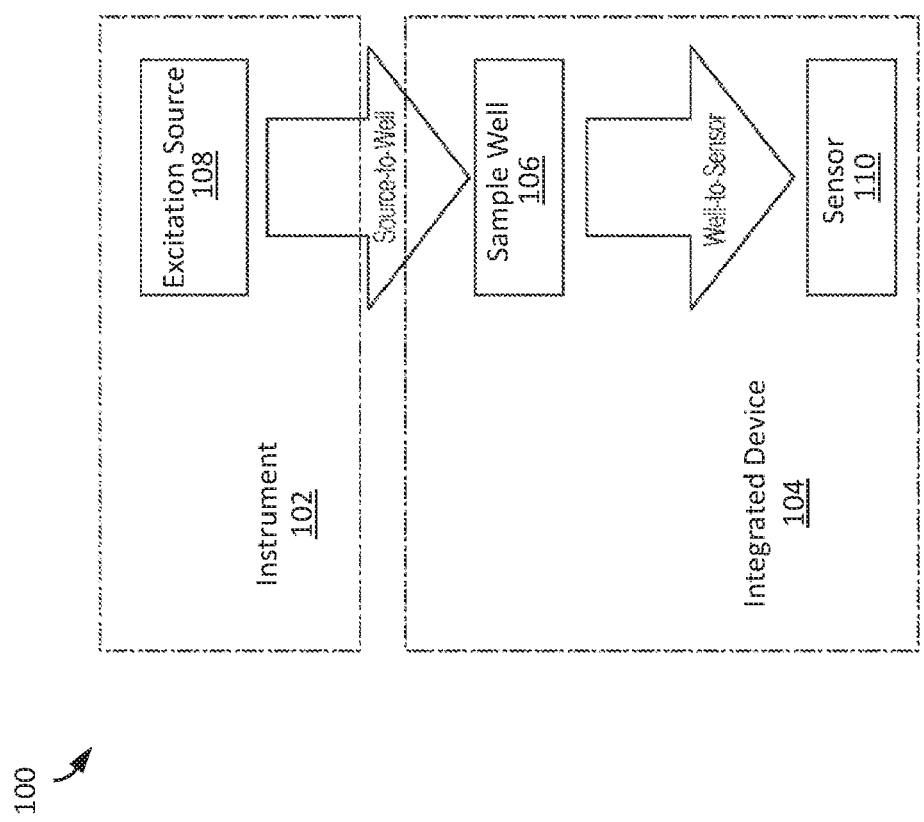
FIG. 1 is a schematic diagram of an exemplary sequencing system which may be used in conjunction with embodiments described herein.

The techniques described herein relate to sequencing of nucleic acids, such as DNA and RNA, and in particular to techniques for automatically identifying nucleotides based upon data acquired from a sensor, as well as sequencing of proteins and peptides. Nucleic acid sequencing allows for the determination of the order and position of nucleotides in a target nucleic acid. Some nucleic acid sequencing methods are based on sequencing by synthesis, in which the identity of a nucleotide is determined as the nucleotide is incorporated into a newly synthesized strand of nucleic acid that is complementary to the target nucleic acid. During sequencing, a polymerizing enzyme (e.g., DNA polymerase) may couple (e.g., attach) to a priming location of a target nucleic acid molecule and add or incorporate nucleotides to the primer via the action of the polymerizing enzyme, which can be generally referred to as a primer extension reaction.

Each nucleotide may be associated with a luminescent molecule (e.g., fluorophore) that emits light in response to excitation, and which is used to label each type of nucleotide to discriminate among the different types of nucleotides. For example, a set of four labels may be used to label the nucleobases present in DNA such that each marker of the set is associated with a different nucleobase, e.g., a first label being associated with adenine (A), a second label being associated with cytosine (C), a third label being associated with guanine (G), and a fourth label being associated with thymine (T). A label may be coupled to a nucleotide through bonding of the label to the nucleotide either directly or indirectly via a linker molecule.

As the primer extension reaction occurs, a nucleotide and its respective luminescent label are retained by the polymerizing enzyme during incorporation of the nucleotide into the synthesized complementary nucleic acid. The luminescent label can be excited by pulses of light during the period in which the nucleotide is incorporated into the synthesized nucleic acid and emits light characteristic of the label. In some embodiments, the label is attached, either directly or indirectly through a linker molecule, to a terminal phosphate of a nucleotide such that the label is detached or released from the nucleotide via the action of the polymerizing enzyme during incorporation of the nucleotide (e.g., cleavage of a phosphate bond). Sensing and analyzing the light emitted by the luminescent label in response to the excitation can allow identifying the nucleotide that was incorporated. As the primer extension reaction occurs, excitation, sensing and analysis is performed for each subsequent nucleotide added to the synthesized nucleic acid. The sequence of the target nucleic acid can be determined from the complementary sequence of the synthesized nucleic acid.

The light emitted by the luminescent label may have a number of characteristics that can be used to distinguish the label from other labels, and thus identify a nucleotide. These characteristics include intensity (e.g., probability of emitting light), a temporal characteristic (e.g., rate of decay of the probability of photon emission after excitation, pulse duration for incorporation and/or interpulse duration before and/or after incorporation), a spectral characteristic (e.g., wavelength(s) of light emitted), or any combination thereof. The light emitted by the luminescent label may be detected by a photodetector that can detect one or more of these characteristics. An example of a suitable photodetector is described in U.S. patent application Ser. No. 14/821,656 entitled "INTEGRATED DEVICE FOR TEMPORAL BINNING OF RECEIVED PHOTONS," which is hereby incorporated by reference in its entirety. As described therein, the photodetector may have the capability of detecting the arrival times of photons, which can allow for determining temporal characteristics of the light emitted by the labels. Detecting temporal characteristics of the emitted light can in turn allow for discriminating between labels that emit light with different temporal characteristics. One example of a temporal characteristic is luminance lifetime. A luminescent molecule, such as a fluorophore, may emit photons in response to excitation. The probability of the luminescent molecule emitting a photon decreases with time after the excitation occurs. The rate of decay in the probability may be exponential. The "lifetime" is characteristic of how fast the probability decays over time. A fast decay is said to have a short lifetime, while a slow decay is said to have a long lifetime. Detecting temporal characteristics of the light emitted by luminescent molecules can allow distinguishing luminescent molecules that have different lifetimes. Labeling different nucleotides with luminescent molecules having different lifetimes can allow distinguishing between the nucleotides based upon a temporal characteristic of the light detected.

The photodetector described in the aforementioned U.S. patent application Ser. No. 14/821,656 can detect the time of arrival of photons with nanosecond or picosecond resolution, and can time-bin the arrival of incident photons. Since the emission of photons is probabilistic, the label may be excited a plurality of times and any resulting photon emissions may be time-binned. Performing such a measurement a plurality of times allows populating a histogram of times at which photons arrived after an excitation event. This information can be analyzed to calculate a temporal characteristic of the emitted light, which can allow distinguishing the label from another label based on the temporal characteristic.

A compact, high-speed apparatus for performing detection and quantitation of single molecules or particles could reduce the cost of performing complex quantitative measurements of biological and/or chemical samples and rapidly advance the rate of biochemical technological discoveries. Moreover, a cost-effective device that is readily transportable could transform not only the way bioassays are performed in the developed world, but provide people in developing regions, for the first time, access to essential diagnostic tests that could dramatically improve their health and well-being. For example, embodiments described herein may be used for diagnostic tests of blood, urine and/or saliva that may be used by individuals in their home, or by a doctor in a remote clinic in a developing country.

A pixelated sensor device with a large number of pixels (e.g., hundreds, thousands, millions or more) allows for the detection of a plurality of individual molecules or particles in parallel. The molecules may be, by way of example and not limitation, proteins and/or DNA. Moreover, a high-speed device that can acquire data at more than one hundred frames per second allows for the detection and analysis of dynamic processes or changes that occur over time within the sample being analyzed.

One hurdle preventing bioassay equipment from being made more compact is the need to filter the excitation light from causing undesirable detection events at the sensor. Optical filters used to transmit the desired signal light (the luminescence) and sufficiently block the excitation light can be thick, bulky, expensive, and intolerant to variations in the incidence angle of light, preventing miniaturization. However, it has been recognized and appreciated herein that using a pulsed excitation source can reduce the need for such filtering or, in some cases, remove the need for such filters altogether. By using sensors capable of determining the time a photon is detected relative to the excitation light pulse, the signal light can be separated from the excitation light based on the time that the photon is received, rather than the spectrum of the light received. Accordingly, the need for a bulky optical filter is reduced and/or removed in some embodiments.

Luminescence lifetime measurements may also be used to identify the molecules present in a sample. An optical sensor capable of detecting when a photon is detected is capable of measuring, using the statistics gathered from many events, the luminescence lifetime of the molecule being excited by the excitation light. In some embodiments, the luminescence lifetime measurement may be made in addition to a spectral measurement of the luminescence. Alternatively, a spectral measurement of the luminescence may be completely omitted in identifying the sample molecule. Luminescence lifetime measurements may be made with a pulsed excitation source. Additionally, luminescence lifetime measurements may be made using an integrated device that includes the sensor, or a device where the light source is located in a system separate from the integrated device.

It has been recognized and appreciated that integrating a sample well (which may include a nanoaperture) and a sensor in a single integrated device capable of measuring luminescent light emitted from biological samples reduces the cost of producing such a device such that disposable bioanalytical integrated devices may be formed. Disposable, single-use integrated devices that interface with a base instrument may be used anywhere in the world, without the constraint of requiring high-cost biological laboratories for sample analyses. Thus, automated bioanalytics may be brought to regions of the world that previously could not perform quantitative analysis of biological samples. For example, blood tests for infants may be performed by placing a blood sample on a disposable integrated device, placing the disposable integrated device into a small, portable base instrument for analysis, and processing the results by a computer for immediate review by a user. The data may also be transmitted over a data network to a remote location to be analyzed, and/or archived for subsequent clinical analyses.

It has also been recognized and appreciated that a disposable, single-use device may be made more simply and for lower cost by not including the light source on the integrated device. Instead, the light source may include reusable components incorporated into a system that interfaces with the disposable integrated device to analyze a sample.

Referring now to FIG. 1, there is shown a schematic diagram of an exemplary sequencing system 100 which may be used in conjunction with embodiments of the sample well fabrication techniques and associated structures described hereinafter. It should be understood however, that the techniques described herein may be implemented in other types of integrated devices, sequencing systems, or other general applications where sample wells or other similar structures are desired.

Generally speaking, the sequencing system 100 includes an instrument 102 that is configured to interface with an integrated device 104 having a plurality of sample wells, where an individual sample well 106 is configured to receive a sample from a specimen (not shown) placed on the surface of the integrated device 104. A specimen may contain multiple samples, and in some embodiments, different types of samples. The plurality of sample wells may have a suitable size and shape such that at least a portion of the sample wells receive one sample from a specimen. In some embodiments, the number of samples within a sample well may be distributed among the sample wells such that some sample wells contain one sample with others contain zero, two or more samples.

In some embodiments, a specimen may contain multiple single-stranded DNA templates, and individual sample wells on a surface of an integrated device may be sized and shaped to receive a single-stranded DNA template. Single-stranded DNA templates may be distributed among the sample wells of the integrated device such that at least a portion of the sample wells of the integrated device contain a single-stranded DNA template. The specimen may also contain tagged dNTPs which then enter in the sample well and may allow for identification of a nucleotide as it is incorporated into a strand of DNA complementary to the single-stranded DNA template in the sample well. In such an example, the "sample" may refer to both the single-stranded DNA and the tagged dNTP currently being incorporated by a polymerase. In some embodiments, the specimen may contain single-stranded DNA templates and tagged dNTPS may be subsequently introduced to a sample well as nucleotides are incorporated into a complementary strand of DNA within the sample well. In this manner, timing of incorporation of nucleotides may be controlled by when tagged dNTPs are introduced to the sample wells of an integrated device.

Excitation energy is provided from an excitation source 108 of the instrument 102 separate from the pixel array of the integrated device. The excitation energy is directed at least in part by elements of the integrated device towards one or more pixels (not shown in FIG. 1) to illuminate an illumination region within the sample well 106. A label may then emit emission energy when located within the illumination region and in response to being illuminated by excitation energy. In some embodiments, one or more excitation sources 108 are part of the instrument of the system where components of the instrument 102 and the integrated device 104 are configured to direct the excitation energy towards one or more pixels.

Emission energy emitted by a sample may then be detected by one or more sensors 110 within a pixel of the integrated device 104. Characteristics of the detected emission energy may provide an indication for identifying the marker associated with the emission energy. Such characteristics may include any suitable type of characteristic, including an arrival time of photons detected by a sensor, an amount of photons accumulated over time by a sensor, and/or a distribution of photons across two or more sensors. In some embodiments, a sensor 110 may have a configuration that allows for the detection of one or more timing characteristics associated with a sample's emission energy (e.g., fluorescence lifetime). The sensor 110 may detect a distribution of photon arrival times after a pulse of excitation energy propagates through the integrated device, and the distribution of arrival times may provide an indication of a timing characteristic of the sample's emission energy (e.g., a proxy for fluorescence lifetime). In some embodiments, the one or more sensors provide an indication of the probability of emission energy emitted by the label (e.g., fluorescence intensity). In some embodiments, a plurality of sensors may be sized and arranged to capture a spatial distribution of the emission energy. Output signals from the one or more sensors may then be used to distinguish a label from among a plurality of labels, where the plurality of labels may be used to identify a sample within the specimen.

Figure 2:
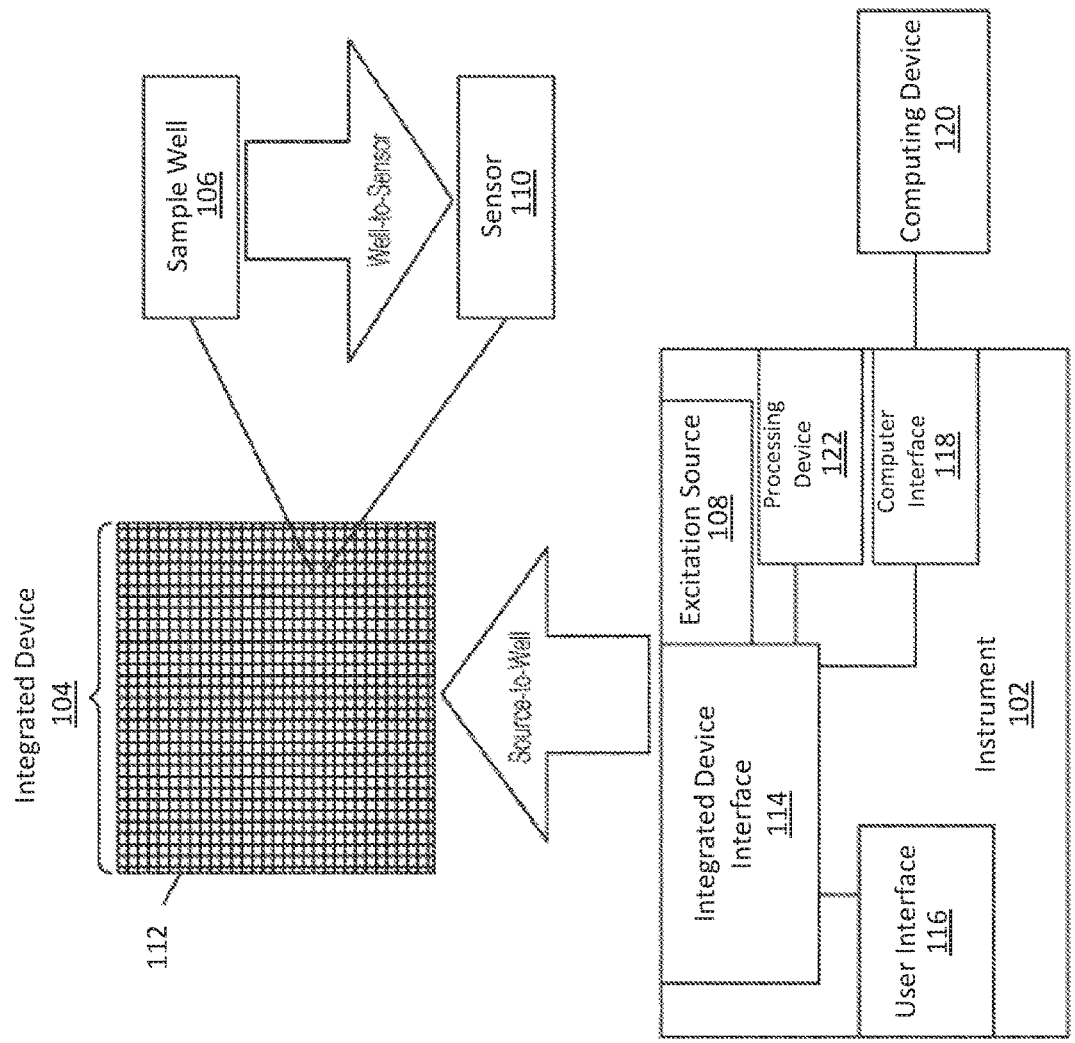
FIG. 2 is a more detailed schematic diagram of the exemplary sequencing system illustrated in FIG. 1.

By way of further illustration, FIG. 2 is a more detailed schematic diagram of the exemplary sequencing system 100 of FIG. 1. Again, the system 100 includes an integrated device 104 that interfaces with an instrument 102. In some embodiments, instrument 102 may include one or more excitation sources 108 integrated as part of instrument 102. In some embodiments, an excitation source 108 may be external to both instrument 102 and integrated device 104, such that instrument 102 may be configured to receive excitation energy from the excitation source 108 and direct it to the integrated device 104. The integrated device 104 may interface with the instrument 102 using any suitable socket for receiving the integrated device 104 and holding it in precise optical alignment with the excitation source 108. The excitation source 108 may also be located within the instrument and configured to provide excitation energy to the integrated device 104. As also illustrated schematically in FIG. 2, the integrated device 104 has multiple individual pixels, where at least a portion of the pixels 112 may perform independent analysis of a sample. Such pixels 112 may be referred to as "passive source pixels" since a pixel receives excitation energy from a source 108 separate from the pixel, where the source excites a plurality of pixels. A pixel 112 has both a sample well 106 configured to receive a sample and a sensor 110 for detecting emission energy emitted by the sample in response to illuminating the sample with excitation energy provided by the excitation source 108. A sample well 106 may retain the sample in proximity to a surface of integrated device 104 to provide ease in delivery of excitation energy to the sample and detection of emission energy from the sample.

Optical elements for guiding and coupling excitation energy from the excitation source 108 to the sample well 106 of the integrated device 104 may be incorporated in both the integrated device 104 and the instrument 102. Such source-to-well elements may include, for example, one or more grating couplers located on the integrated device 104 to couple excitation energy to the integrated device 104 and waveguides to deliver excitation energy from instrument 102 to sample wells 106 in pixels 112. In some embodiments, elements located on the integrated device 104 may act to direct emission energy from the sample well 106 towards the sensor 110. The sample wells 106, a portion of the excitation source-to-well optics, and the sample well-to-sensor optics are located on the integrated device 104. The excitation source 108 and a portion of the source-to-well components are located in the instrument 102. In some embodiments, a single component may play a role in both coupling excitation energy to a sample well 106 and delivering emission energy from the sample well 106 to sensor 110. Examples of suitable components for coupling excitation energy to a sample well and/or directing emission energy to a sensor, to include in an integrated device, are described in U.S. patent application Ser. No. 14/821,688 entitled "INTEGRATED DEVICE FOR PROBING, DETECTING AND ANALYZING MOLECULES," and U.S. patent application Ser. No. 14/543,865 entitled "INTEGRATED DEVICE WITH EXTERNAL LIGHT SOURCE FOR PROBING, DETECTING, AND ANALYZING MOLECULES," both of which are incorporated by reference in their entirety.

With respect to plurality of pixels 112 in the embodiment of FIG. 2, an individual pixel 112 may be associated with its own individual sample well 106 and at least one sensor 110. The plurality of pixels 112 may be arranged in an array, and there may be any suitable number of pixels in the array. The number of pixels in integrated device 104 may be in the range of approximately 10,000 pixels to 100,000,000 pixels or any value or range of values within that range. In some embodiments, the pixels may be arranged in an array of 512 pixels by 512 pixels. Integrated device 104 and instrument 102 may include multi-channel, high-speed communication links (not shown) for handling data associated with large pixel arrays (e.g., more than 10,000 pixels).

As further illustrated in FIG. 2, the instrument 102 interfaces with the integrated device 104 through an integrated device interface 114. The integrated device interface 114 may include, for example, components to position and/or align the integrated device 104 to the instrument 102 to facilitate or improve coupling of excitation energy from excitation source 108 to the integrated device 104. The excitation source 108 may be any suitable light source that is arranged to deliver excitation energy to at least one sample well. Examples of suitable excitation sources are described in the aforementioned Ser. No. 14/821,688 application. In some embodiments, the excitation source 108 includes multiple excitation sources that are combined to deliver excitation energy to the integrated device 104. Such multiple excitation sources may be configured to produce multiple excitation energies or wavelengths. The integrated device interface 114 may receive readout signals from the sensors 110 in the pixels 112 of the integrated device 104. The integrated device interface 114 may be designed such that the integrated device 104 attaches to the instrument 102 by securing the integrated device 104 to the integrated device interface 102.

Referring still to FIG. 2, the instrument 102 further includes a user interface 116 for controlling the operation of instrument 102. The user interface 116 is configured to allow a user to input information into the instrument, such as for example commands and/or settings used to control the functioning of the instrument. In some embodiments, the user interface 116 may include buttons, switches, dials, and a microphone for voice commands. Additionally, the user interface 116 may allow a user to receive feedback on the performance of the instrument and/or integrated device, such as proper alignment and/or information obtained by readout signals from the sensors on the integrated device. In some embodiments, the user interface 116 may provide feedback using a speaker to provide audible feedback, and indicator lights and/or display screen for providing visual feedback. In some embodiments, the instrument 102 includes a computer interface 118 used to connect with an external computing device 120. Any suitable computer interface 118 and computing device 120 may be used. For example, the computer interface 118 may be a USB interface or a FireWire interface. The computing device 120 may be any general purpose computer, such as a laptop or desktop computer. The computer interface 118 facilitates communication of information between the instrument 102 and the computing device 120. Input information for controlling and/or configuring the instrument 102 may be provided through the computing device 120 in communication with the computer interface 118 of the instrument 102. In addition, output information may be received by the computing device 120 through the computer interface 118. Such output information may include, for example, feedback about performance of the instrument 102 and/or integrated device 112 and information from the readout signals of the sensor 110. The instrument 102 may also include a processing device 122 for analyzing data received from the sensor 110 and/or sending control signals to the excitation source 108. In some embodiments, the processing device 122 may comprise a general purpose processor, a specially-adapted processor (e.g., a central processing unit (CPU) such as one or more microprocessor or microcontroller cores, a field-programmable gate array (FPGA), an application-specific integrated circuit (ASIC), a custom integrated circuit, a digital signal processor (DSP), or a combination thereof.) In some embodiments, the processing of data from the sensor 110 may be performed by both the processing device 122 and the external computing device 120. In other embodiments, the computing device 120 may be omitted and processing of data from the sensor 110 may be performed entirely by the processing device 122.

Figure 3A:
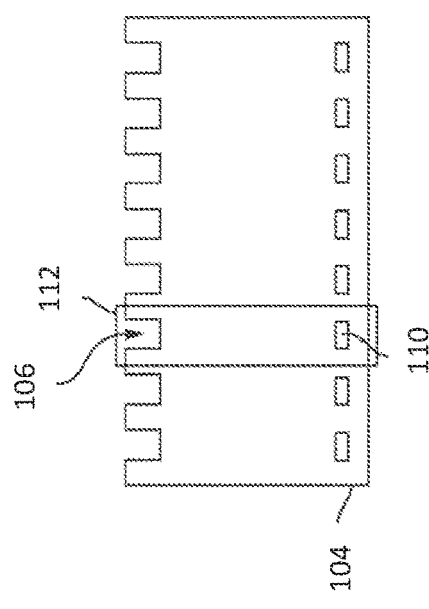
FIG. 3A and FIG. 3B are cross-sectional views illustrating an integrated device of the exemplary sequencing machine in further detail.

Referring now to FIG. 3A, there is shown a cross-sectional schematic diagram of the integrated device 104 illustrating a row of pixels 112. Each pixel 112 includes a sample well 106 and a corresponding sensor 110. The sensor 110 may be aligned and positioned to the sample well 106 such that the sensor 110 receives emission energy emitted by a sample (not shown) within sample well 112. Examples of suitable sensors are also described in the aforementioned Ser. No. 14/821,656 application.

Figure 3B:
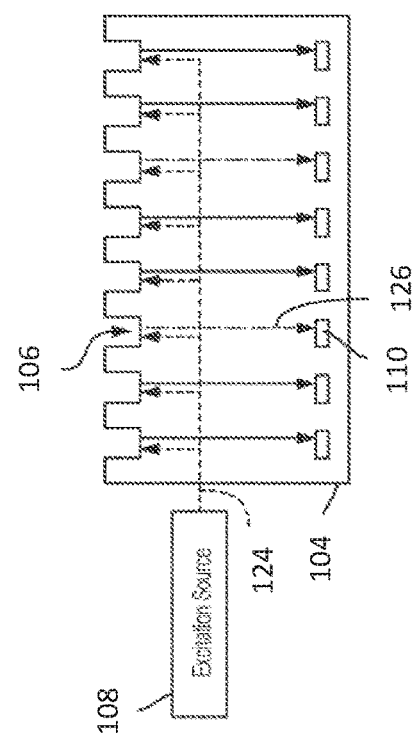

As discussed previously, an excitation source 108 coupled to the integrated device 104 may provide excitation energy to one or more pixels of the integrated device 104. By way of further illustration, FIG. 3B is a cross-sectional schematic diagram illustrating coupling of the excitation source 108 to the integrated device 104 to provide excitation energy 124 (the path of which is shown in dashed lines) to the sample wells 106 of the integrated device 104. Components (not shown) located off of the integrated device 104 may be used to position and align the excitation source 108 to the integrated device. Such components may include, for example, optical components such as lenses, mirrors, prisms, apertures, attenuators, and/or optical fibers. Additional mechanical components may also be included in the instrument 102 to allow for control of one or more alignment components. Such mechanical components may include, for example, actuators, stepper motors, and/or knobs.

The integrated device 104 includes components that direct the excitation energy 124 towards pixels 112 therein. More specifically, within each pixel 112, excitation energy is coupled to the sample well 106 associated with the pixel.

Although FIG. 3B illustrates excitation energy coupling to each sample well 106 in a row of pixels 112, in some embodiments, it is possible that excitation energy may not couple to all of the pixels 112 in a given row. In some embodiments, excitation energy may couple to a portion of pixels 112 or sample wells 106 in a row of pixels 112 of the integrated device 104. The excitation energy 124 may illuminate a sample located within a sample well 106. The sample may reach an excited state in response to being illuminated by the excitation energy. When a sample is in an excited state, the sample may emit emission energy 126 as shown in FIG. 3B, which emission energy 126 may in turn be detected by a sensor 110. In some embodiments, the sensor 110 may include multiple sub-sensors.

A sample to be analyzed may be introduced into the sample well 106 of pixel 112. The sample may be a biological sample or any other suitable sample, such as a chemical sample. Further, the sample may include multiple molecules and the sample well 106 may be configured to isolate a single molecule. In some instances, the dimensions of the sample well 106 may act to confine a single molecule within the sample well, thereby allowing measurements to be performed on the single molecule. An excitation source 108 may be configured to deliver excitation energy into the sample well 106, so as to excite the sample or at least one luminescent marker attached to the sample or otherwise associated with the sample while it is within an illumination area within the sample well 106.

When an excitation source delivers excitation energy to a sample well, at least one sample within the well may luminesce, and the resulting emission may be detected by a sensor 110. As used herein, the phrases "a sample may luminesce" or "a sample may emit radiation" or "emission from a sample" mean that a luminescent tag, marker, or reporter, the sample itself, or a reaction product associated with the sample may produce the emitted radiation.

One or more components of the integrated device 104 may direct emission energy towards a sensor 110. The emission energy or energies may be detected by the sensor 110 and converted to at least one electrical signal. The electrical signals may be transmitted along conducting lines in the circuitry of the integrated device 104 connected to the instrument 102 through the integrated device interface 114, such as already described in connection with FIG. 2. The electrical signals may be subsequently processed and/or analyzed by a suitable computing device either located on the instrument 102 or off the instrument 102, such as computing device 120 and/or the processing device 122 shown in FIG. 2.

In operation, parallel analyses of samples within the sample wells are carried out by exciting the samples within the wells using the excitation source and detecting signals from sample emission with the sensors. Emission energy from a sample may be detected by a corresponding sensor and converted to at least one electrical signal. The resulting signal, or signals, may be processed on the integrated device in some embodiments, or transmitted to the instrument for processing by the processing device and/or computing device. Signals from a sample well may be received and processed independently from signals associated with the other pixels.

In some embodiments, a sample may be labeled with one or more markers, and emission associated with the markers is discernable by the instrument. For example, the sensor may be configured to convert photons from the emission energy into electrons to form an electrical signal that may be used to discern a lifetime that is dependent on the emission energy from a specific marker. By using markers with different lifetimes to label samples, specific samples may be identified based on the resulting electrical signal detected by the sensor.

A sample may contain multiple types of molecules and different luminescent markers may uniquely associate with a molecule type. During or after excitation, the luminescent marker may emit emission energy. One or more properties of the emission energy may be used to identify one or more types of molecules in the sample. Properties of the emission energy used to distinguish among types of molecules may include a fluorescence lifetime value, intensity, and/or emission wavelength. A sensor may detect photons, including photons of emission energy, and provide electrical signals indicative of one or more of these properties. In some embodiments, electrical signals from a sensor may provide information about a distribution of photon arrival times across one or more time intervals. The distribution of photon arrival times may correspond to when a photon is detected after a pulse of excitation energy is emitted by an excitation source. A value for a time interval may correspond to a number of photons detected during the time interval. Relative values across multiple time intervals may provide an indication of a temporal characteristic of the emission energy (e.g., lifetime). Analyzing a sample may include distinguishing among markers by comparing values for two or more different time intervals within a distribution. In some embodiments, an indication of the intensity may be provided by determining a number of photons across all time bins in a distribution.

The term "nucleic acid," as used herein, generally refers to a molecule comprising one or more nucleic acid subunits. A nucleic acid may include one or more subunits selected from adenosine (A), cytosine (C), guanine (G), thymine (T) and uracil (U), or variants thereof. In some examples, a nucleic acid is deoxyribonucleic acid (DNA) or ribonucleic acid (RNA), or derivatives thereof. A nucleic acid may be single-stranded or double stranded. A nucleic acid may be circular.

The term "nucleotide," as used herein, generally refers to a nucleic acid subunit, which can include A, C, G, T or U, or variants or analogs thereof. A nucleotide can include any subunit that can be incorporated into a growing nucleic acid strand. Such subunit can be an A, C, G, T, or U, or any other subunit that is specific to one or more complementary A, C, G, T or U, or complementary to a purine (i.e., A or G, or variant or analogs thereof) or a pyrimidine (i.e., C, T or U, or variant or analogs thereof).

A nucleotide generally includes a nucleoside and at least 1, 2, 3, 4, 5, 6, 7, 8, 9, 10, or more phosphate ($PO_3$) groups. A nucleotide can include a nucleobase, a five-carbon sugar (either ribose or deoxyribose), and one or more phosphate groups. Ribonucleotides are nucleotides in which the sugar is ribose. Deoxyribonucleotides are nucleotides in which the sugar is deoxyribose. A nucleotide can be a nucleoside monophosphate or a nucleoside polyphosphate. A nucleotide can be a deoxyribonucleoside polyphosphate, such as, e.g., a deoxyribonucleoside triphosphate, which can be selected from deoxyadenosine triphosphate (dATP), deoxycytidine triphosphate (dCTP), deoxyguanosine triphosphate (dGTP), deoxyuridine triphosphate (dUTP) and deoxythymidine triphosphate (dTTP) dNTPs, that include detectable labels (e.g., fluorophores).

With respect to the sensor 110, a photodetector may time bin the arrival of incident photons from a label in response to exposing the label to an excitation source 108 (e.g., by a laser pulse). A label may be repeatedly excited, and the arrival of incident photons from the label may be time binned. As an example, during a 10 ms measurement period, laser excitation pulses may be emitted at a frequency of 100 MHz to excite the label. The label may emit a photon with a low probability (e.g., 1 photon emission in 10,000 excitations). If the label is excited a number of times (e.g., 1 million times) within a 10 ms period, approximately 100 photons may be received. In some instances, a label may not become excited after exposure to an excitation source and not emit a photon after an excitation event, which may contribute to the low probability of emission. As discussed above, the arrival times of the incident photons with respect to the excitation may be time-binned. As such, a photodetector may provide signals representing the number of photons in each time bin.

Figure 4:
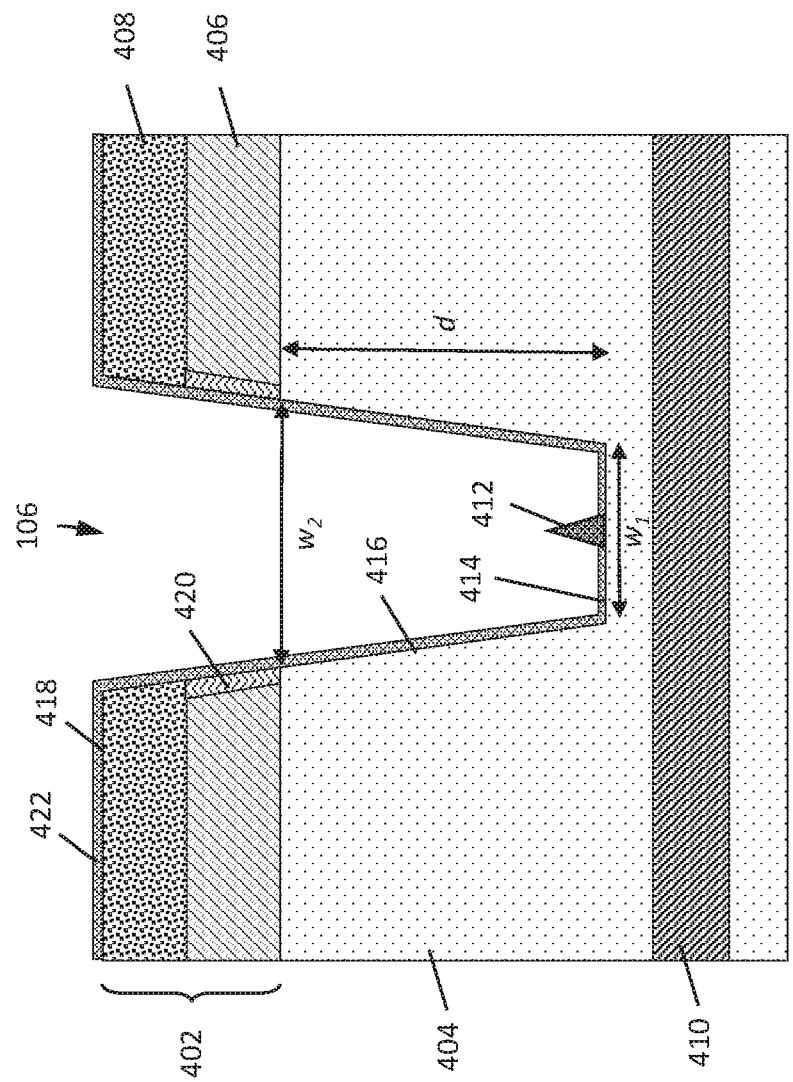
FIG. 4 is a cross-sectional view illustrating an example sample well of the integrated device of FIG. 1, FIG. 2, FIG. 3A and FIG. 3B.

Referring now to FIG. 4, there is shown a cross-sectional view illustrating an example sample well 106 of the integrated device of FIG. 1, FIG. 2, FIG. 3A and FIG. 3B. As shown in FIG. 4, the sample well 106 is defined by an opening formed through a metal stack 402 disposed on a cladding layer 404 (e.g., $SiO_2$). The metal stack 402 includes at least one layer of a metal material, such as for example an aluminum layer 406 positioned proximate to the top of the cladding layer 404 and a titanium nitride layer 408 over the aluminum layer 406.

The aluminum layer 406 may include copper and/or silicon. In some embodiments, the aluminum layer 406 may include less than approximately 2% of copper and/or silicon, and may have a thickness in the range of about 30 nm to 150 nm, or any value or range of values within that range. In some embodiments, the aluminum layer is about 65 nm. The titanium nitride layer 408 may also include a layer of titanium in contact with the aluminum layer 406 and have a thickness of in the range of 1 nm to 150 nm, or any value or range of values within that range. In some embodiments, the thickness of titanium nitride layer is approximately 80 nm. For illustrative purposes, FIG. 4 also depicts an exemplary waveguide structure 410 (e.g., silicon nitride) that facilitates delivery of excitation optical energy to the sample well 106.

The depth, d, of the recess formed in the $SiO_2$ cladding layer 404 defines the distance of dye emission from the aluminum layer 406 (e.g., Al—Cu), which may serve as a metal reflector. This distance in turn determines the directionality of dye emission toward the optical sensor (not shown), which impacts collection efficiency. In one embodiment, a desired depth for the oxide recess is about 300 nm. In addition, the lateral dimensions (diameter) of the sample well (which may also be referred to as a reaction chamber) impact the ability of a DNA template and dye-labelled nucleotides to access, through diffusion, the enzyme that is immobilized at the bottom of the reaction chamber. Generally speaking, larger dimensions improve such access. Furthermore, the lateral dimensions of the reaction chamber 106 also impact the volume of dye solution that is illuminated by the waveguide 410. In particular, the dimension $w_1$ at the bottom of the reaction chamber has a significant impact on the volume of dye solution that is excited, where smaller dimensions result in a smaller volume of dye solution being excited, which in turn provides a lower dye background signal. In an exemplary embodiment, the sample well 106 has a diameter $w_2$ of about 150-250 nm at the top of the oxide cladding layer 404, and a diameter $w_1$ of about 75-200 nm at the bottom of the oxide recess. As will be further observed from FIG. 4, the exemplary embodiment of the sample well 106 features a tapered etch profile.

A selectively formed moiety 412 is shown located at a bottom surface 414 of the sample well 106. In some approaches to selective functionalization for immobilizing an enzyme at the bottom of the sample well 106, the bottom surface 414 of the sample well 106 may have a different composition than other surfaces (e.g., the sidewalls 416 of the sample well 106 and top surface 418 of the integrated device). In such an approach, the bottom surface 412 of the sample well is the material of the cladding layer (e.g., exposed $SiO_2$) while the sidewalls of the sample well 106 are formed from a metal oxide spacer material (e.g., $TiO_2$, $Al_2O_3$, $HfO_2$, $ZrO_2$, and $Ta_2O_5$, etc., not shown in FIG. 4). The top surface 418 of the integrated device may include a metal oxide material formed by oxidation of the top surface of layer 408 (e.g., $TiO_2$ formed by oxidation of TiN). In the present embodiment, however, a completed structure, such as the one shown in FIG. 4, may use a sidewall spacer in a sacrificial manner which is therefore absent from a completed structure. That is, sidewalls 416 of the resulting FIG. 4 embodiment may be the same material as the bottom surface 414 (e.g., $SiO_2$). Advantageously, the sidewalls 416 of the sample well 106 and the top surface 418 are substantially free of functionalized material. As will be described in further detail below, sidewalls of the aluminum layer 406 may be protected by an encapsulant sidewall spacer 420, such as amorphous silicon (α-Si) for example, to protect the aluminum layer 406 during sacrificial spacer removal. An antifouling passivation coating 422, such as a polymer for example, may also be applied over the surfaces of the structure in FIG. 4.

Figure 5:
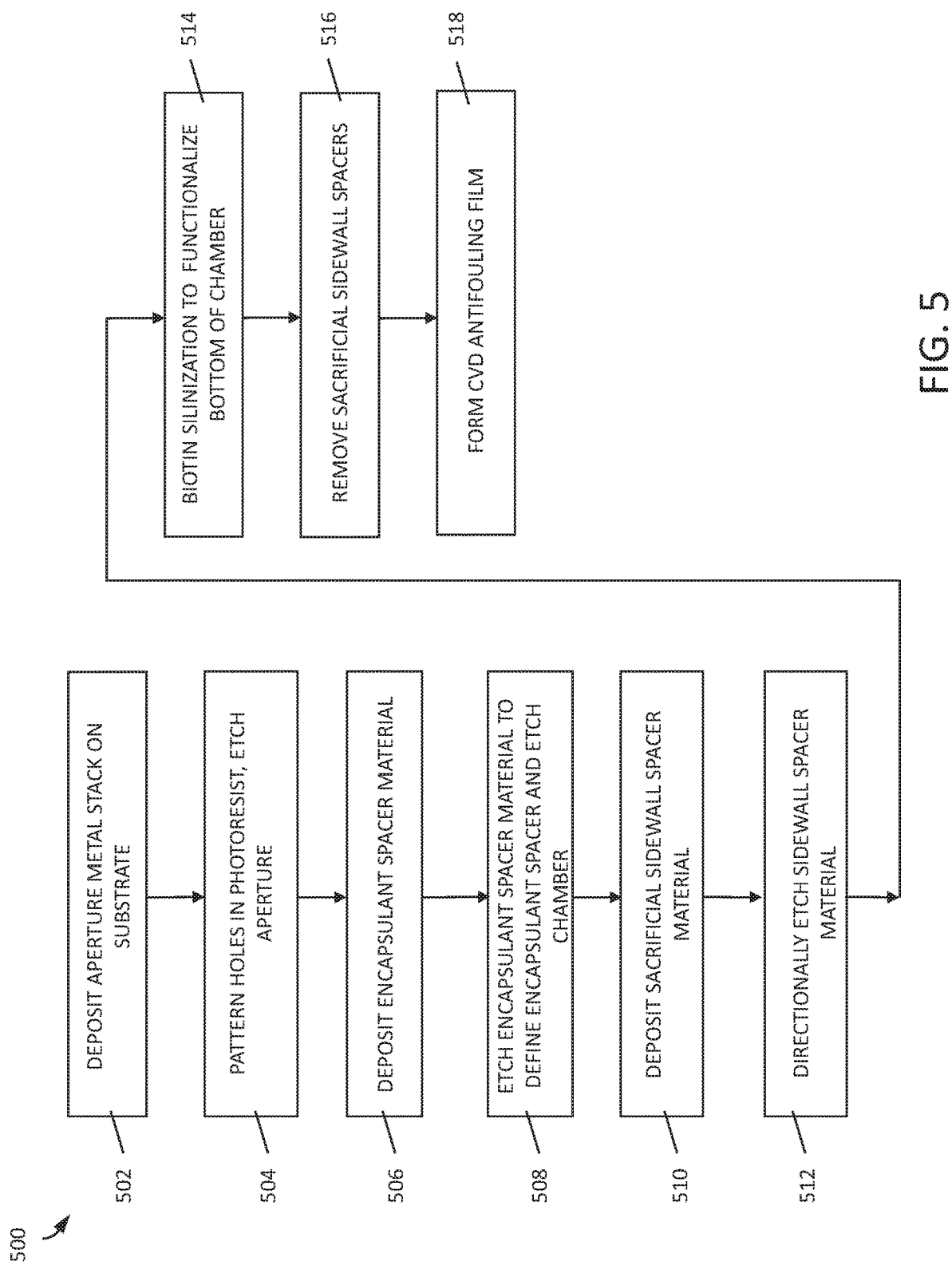
FIG. 5 is a flow diagram illustrating an exemplary process flow for forming the sample well of FIG. 4.

Referring generally now to the flow diagram of FIG. 5 and the cross sectional views of FIGS. 6-15, an exemplary process 500 of forming a sample well structure similar to FIG. 4 is illustrated. For ease of illustration, like elements and components are denoted with like reference numbers in the various figures. As indicated in block 502 of FIG. 5 and the cross sectional view of FIG. 6, a metal aperture film stack 406, 408 (e.g., Al—Cu, TiN/Ti) is formed over the $SiO_2$ cladding layer 404. Optionally, prior to forming the metal aperture film stack 406, 408, the top surface of the cladding layer 404 may be planarized using a suitable process (e.g., a CMP process). In an exemplary embodiment, the aluminum layer 406 may be deposited to a thickness of about 65 nm, with layer 408 being deposited to a thickness of about 10 nm of Ti and about 70 nm of TiN.

Figure 7:
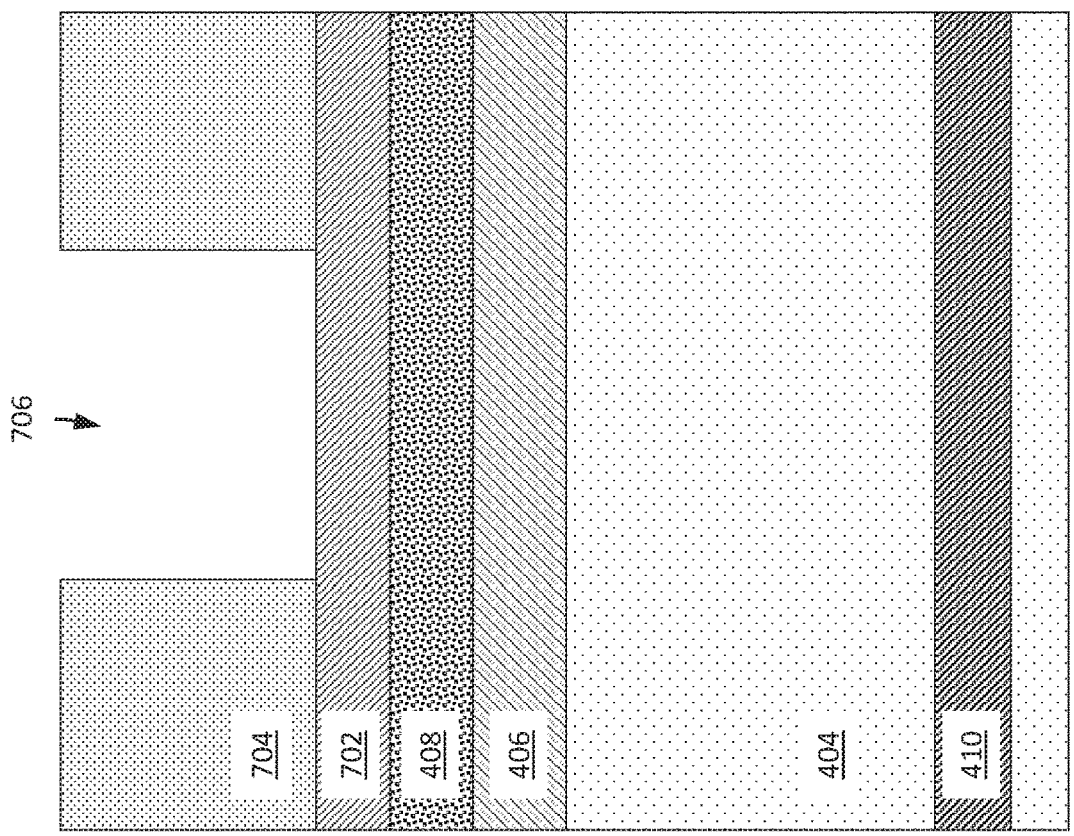
FIGS. 6-15 are sequential cross-sectional views illustrating the exemplary fabrication process flow of FIG. 5.
Figure 6:
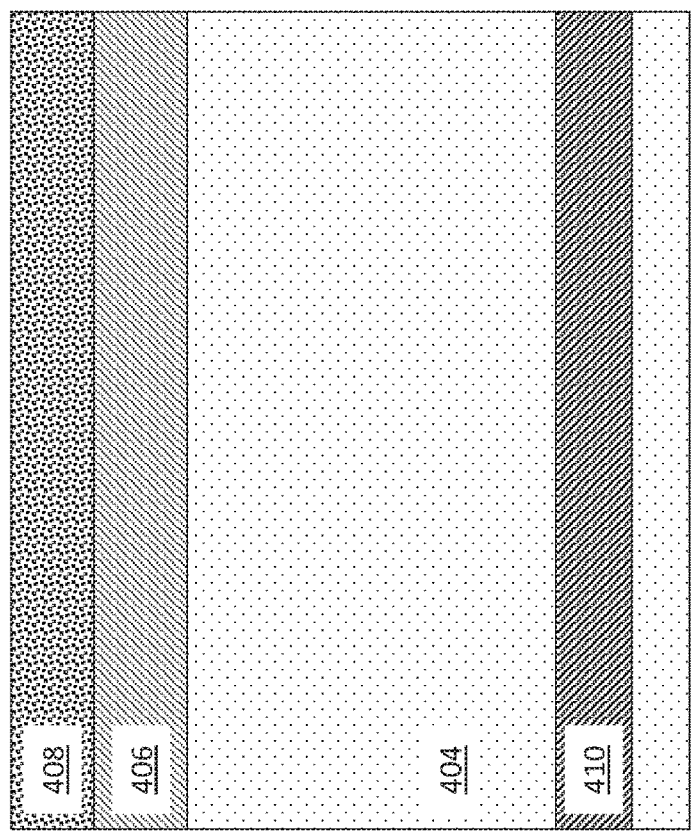
Figure 8:
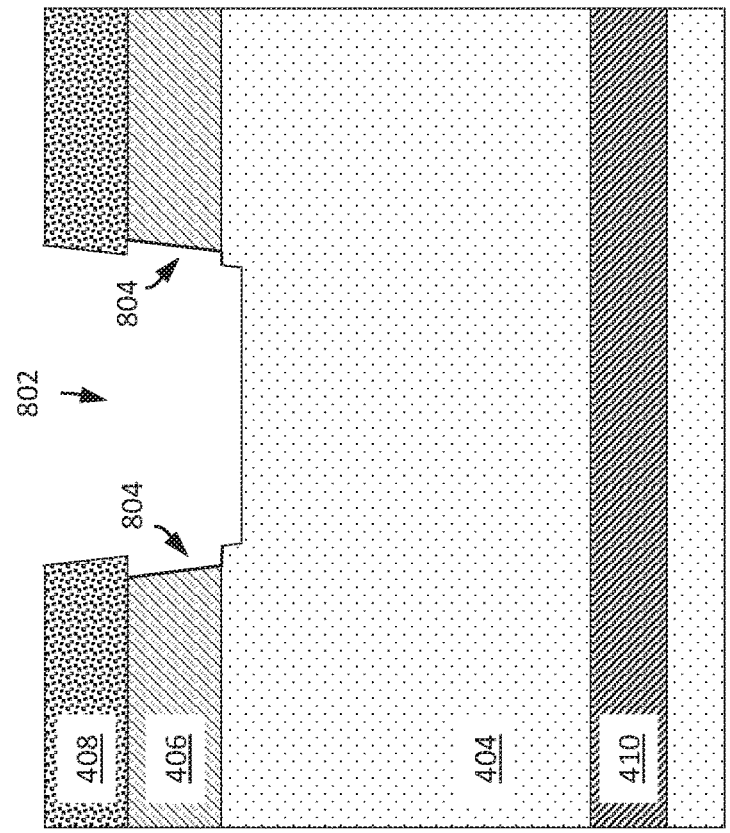

Following the formation of the metal aperture film stack 406, 408, holes are patterned in a photoresist layer to facilitate an etch process to define an aperture in the metal film stack and a reaction chamber (sample well) in the $SiO_2$ cladding, as indicated in block 504 in FIG. 5. Patterning and etching is also shown in the sequence of FIGS. 7-8. As particularly shown in FIG. 7, a bottom antireflective coating (BARC) layer 702 may first be formed over the Ti/TIN layer 408 before the photoresist layer 704 is formed. A hole 706 corresponding to a location of a sample well is then patterned in the photoresist layer 704, such as by photolithographic exposure and development of the photoresist layer 704. The hole 706 may be, for example, circular in shape and in the range of about 150-250 nm in diameter. In further preparation for aperture etching, the BARC layer 702 may be selectively removed using a plasma etching process, or any suitable technique.

Referring to FIG. 8, an etch of the metal aperture film stack 406, 408 is performed to define an aperture 802. The etch process used to define the aperture 802 shown in FIG. 8 may be performed by the same process used to remove the BARC layer 702 in FIG. 7, such as for example by a plasma etch process that includes $Cl_2$ and/or $BCl_3$. The plasma metal etching process may be followed by an $O_2$ ashing step, water rinse and/or post-etch cleaning step. A Cl-based etch of aluminum may be somewhat isotropic in nature, possibly leading to undercut regions 804 in layer 406. In addition, a wet clean step can also contribute to the undercut regions 804.

Figure 9:
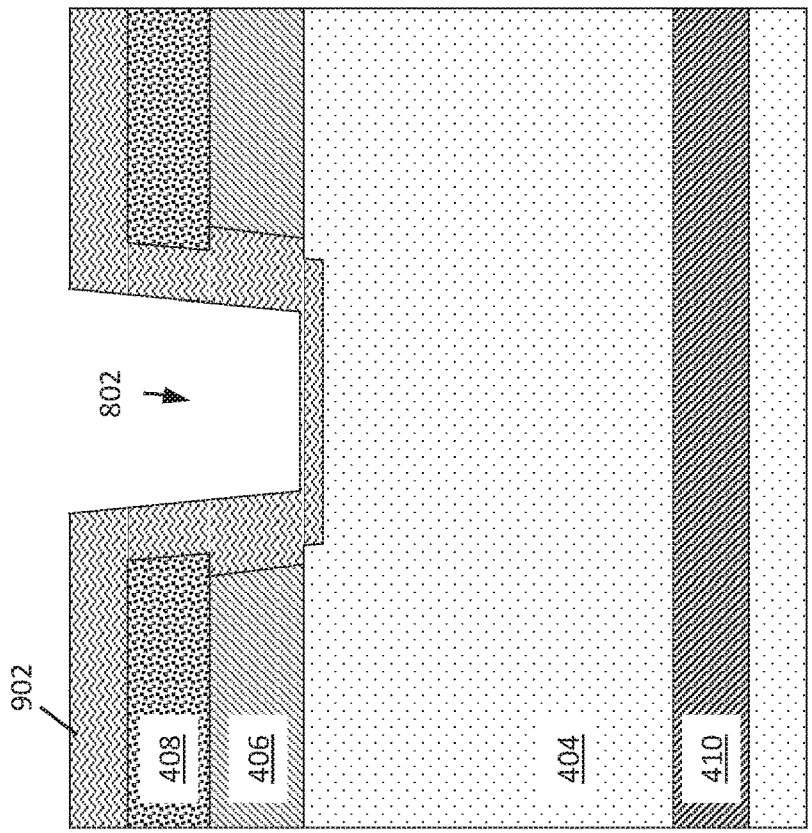

As indicated in block 506 of FIG. 5 and illustrated in FIG. 9, the process 500 continues with the formation of an encapsulant spacer material 902 within the aperture 802. The encapsulant spacer material 902 is selected from a material suitable to protect the sidewalls of the metal film stack 406, 408 and reduce or minimize the formation of metal fluoride residue from subsequent etching of the $SiO_2$ cladding material 404 and subsequent sacrificial spacer removal. In some embodiments, the encapsulant spacer material 902 may be amorphous silicon ($\alpha$-Si) deposited by plasma enhanced chemical vapor deposition (PECVD). In other embodiments, the encapsulant spacer material 902 may be PECVD deposited $SiO_2$, SiON, or SiN. In still other embodiments, the encapsulant spacer material 902 may be an oxide material (e.g., $TiO_2$, $Al_2O_3$, $SiO_2$, $HfO_2$, etc.) formed by atomic layer deposition (ALD). Generally, the encapsulant spacer material 902 may be deposited in a conformal manner with respect to the top surface of metal layer 408 and the bottom of the aperture 802. In some embodiments, the encapsulant spacer material 902 may be thicker at locations on the top surface of metal layer 408 and thinner along the bottom of the aperture 802.

Figure 10:
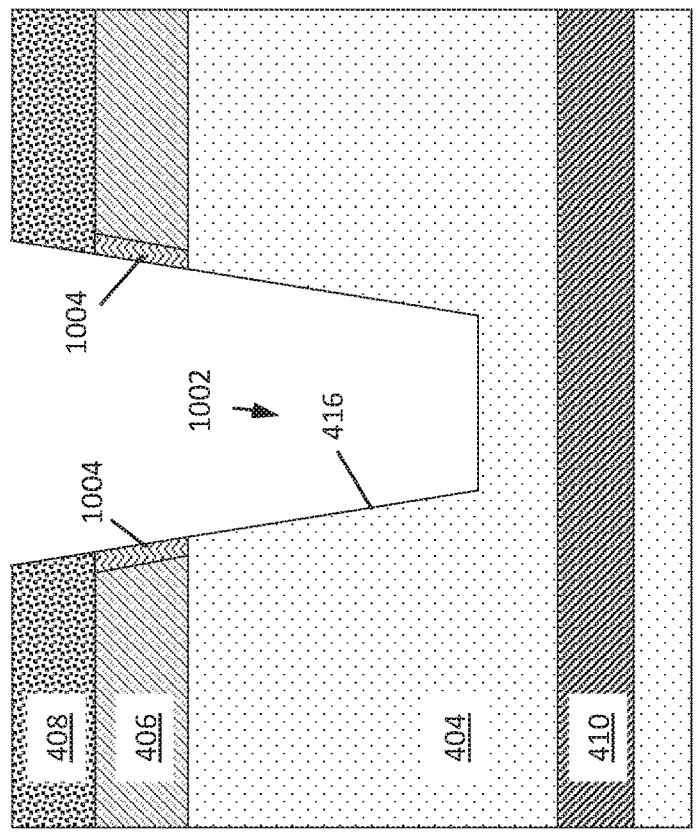
Figure 13:
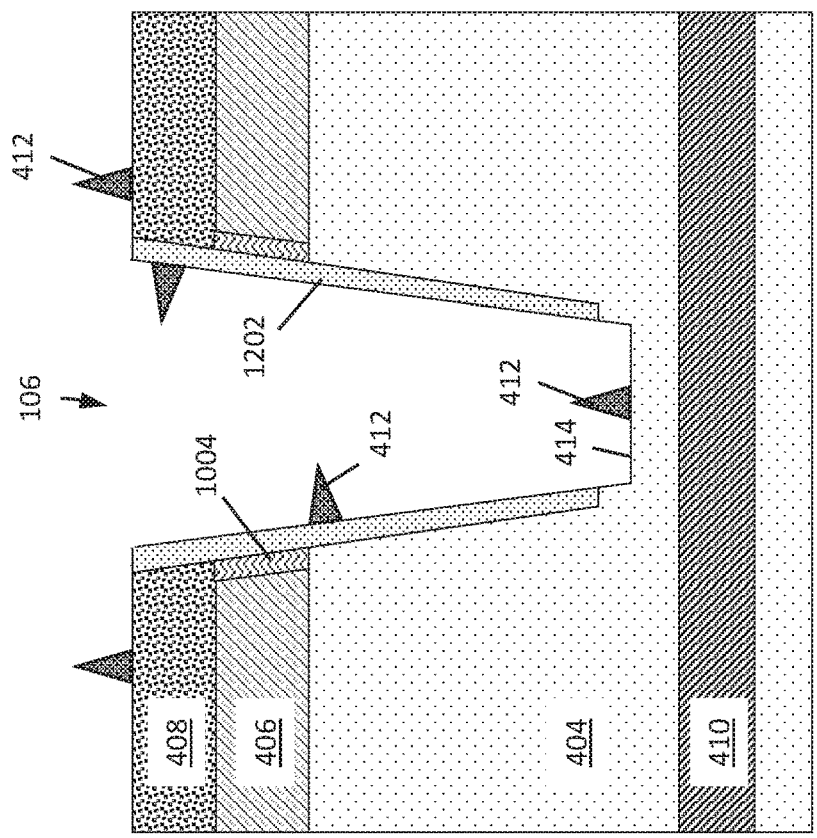

An etch of the encapsulant spacer material and the $SiO_2$ cladding material 404 to define the reaction chamber 1002 is indicated in block 508 of FIG. 5 and illustrated in FIG. 10. The encapsulant spacer/chamber etch may be a fluorocarbon based etch, such as described above, followed by an $O_2$ ash process and a post-etch clean process. As the etch of the encapsulant material 902 (and $SiO_2$ cladding material 404) is substantially an anisotropic, directional etch, an encapsulant spacer 1004 may remain on sidewalls of the aluminum containing metal layer 406 and/or the titanium containing layer 408. The encapsulant spacer 1004 may advantageously protect the exposed sidewalls of the metal film 406 and minimize formation of metal fluoride residues during the reaction chamber etch, which might otherwise be vulnerable to corrosion/humidity or reaction with F, Cl during subsequent etching. Oxide material of the cladding layer 404 may be removed through the use of a dry fluorocarbon etch (e.g., $CF_4$, $CHF_3$, $C_4F_8$, $C_3H_2F_6$), followed by an $O_2$ ashing step and post-etch cleaning step. In some embodiments, the dry etching process may occur for a duration of time to achieve a desired etch depth or, alternatively through the use of an etch stop layer (not shown) be positioned at a location within the cladding layer 404 to achieve the desired etch depth. Although in some embodiments one or more sidewalls 418 of the resulting cavity formed by the etching process may be at an angle normal to a top surface of the integrated device, in other embodiments (such as illustrated in FIG. 10) sidewalls 418 of the reaction chamber 1002 may be tapered at an angle in the range of 1° to 15°, with respect to a normal to the top surface of the integrated device. In other words, the reaction chamber 1002 may be tapered such that its diameter decreases with increasing depth.

Figure 11:
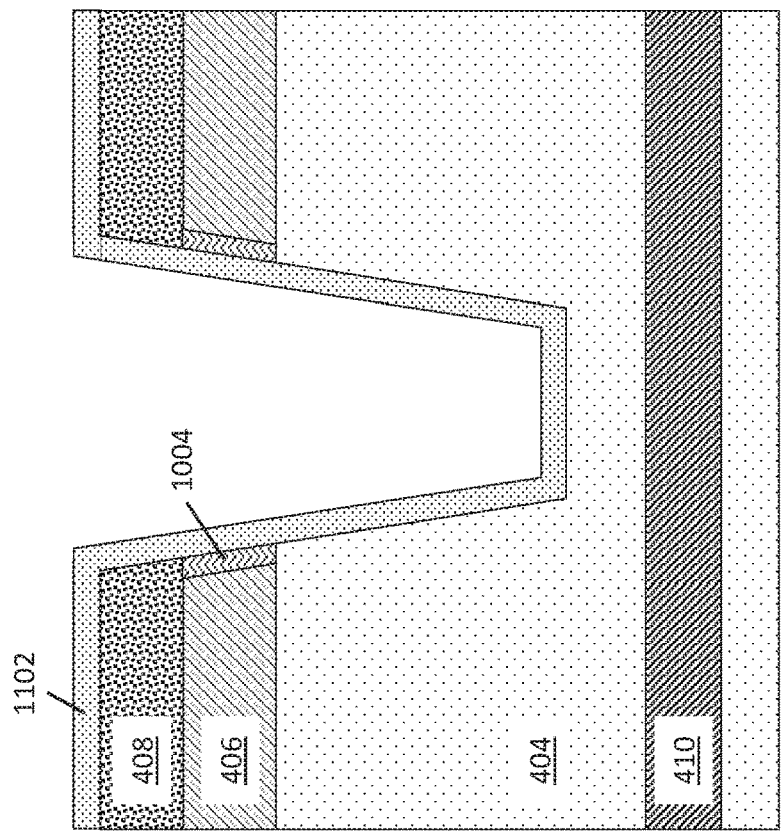

Once the reaction chamber 1002 is defined, the process of FIG. 5 may then proceed to block 510, where a sacrificial sidewall spacer material 1102 is deposited as illustrated in FIG. 11. In one embodiment, the sacrificial sidewall spacer material 1102 may be a layer of $Al_2O_3$ formed to a thickness of about 3 nm to about 50 nm, and more specifically about 12 nm by ALD. Other sacrificial spacer materials may also be used, however, including for example, $TiO_2$, TiN, $Ta_2O_5$, TaN, $ZrO_2$ and $HfO_2$. Additionally, an intended sacrificial spacer such as an aluminum oxide layer could also be deposited over an intended permanent spacer of a different material such as $TiO_2$. Such a multi-stack sidewall 416 would afford the benefits of the sacrificial spacer with the added protection provided by a permanent spacer layer.

Figure 12:
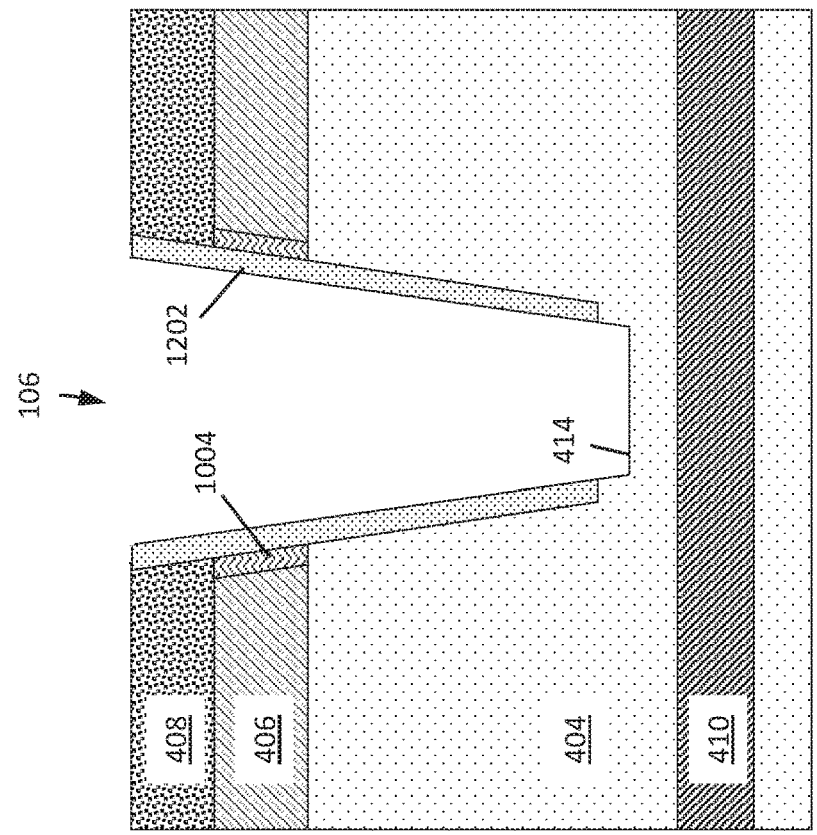
Figure 15:
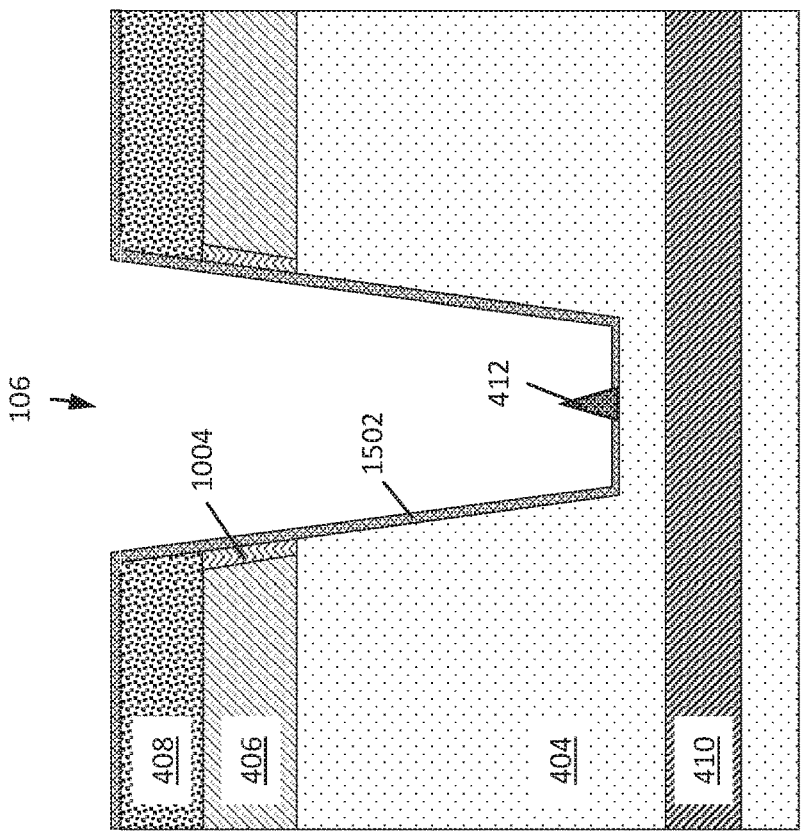

Then, as indicated in block 512 of FIG. 5 and illustrated in FIG. 12, an anisotropic etch is used to remove horizontally disposed surfaces of the sacrificial sidewall spacer material 1102, thereby defining the sacrificial sidewall spacers 1202 and exposing the $SiO_2$ bottom surface 414 of the sample well 106. Then, as indicated in block 512 of FIG. 5 and illustrated in FIG. 12, an anisotropic etch is used to remove horizontally disposed surfaces of the sacrificial sidewall spacer material 1102, thereby defining the sacrificial sidewall spacers 1202 and exposing the $SiO_2$ bottom surface 414 of the sample well 106. For many of the spacer materials mentioned, such as $Al_2O_3$ and $TiO_2$ for example, a fluorocarbon or $BCl_3$ etch chemistry (with $Cl_2$ and/or Ar) may be used.

In other embodiments where a permanent sidewall spacer is used, a next processing step might otherwise involve a relatively lengthy passivation process prior to biotin salinization in order to selectively form the bottom moiety. In the present embodiment, however, this passivation step is omitted, and the process proceeds to block 514 of FIG. 5 for biotin silinization. As particularly illustrated in FIG. 13, a functional biotin silane layer (function moiety 412) is applied to the structure of FIG. 12 to provide a site for attachment of a biomolecule at the $SiO_2$ bottom surface 414 of the sample well 106. In some embodiments the layer includes biotin functional sites for attachment of a streptavidin-labeled biomolecule (i.e., direct bonding to the $SiO_2$ bottom surface 414). In other embodiments, the layer may include an intermediate coupling agent for subsequent attachment of a biotin functional site. For example, an alkyne coupling agent can be used for attachment of a biotin-azide. As another example, an isocyanate coupling agent may be used for attachment of a biotin-thiol. As still another example, an epoxy coupling agent may be used for attachment of a biotin-thiol. In such intermediate coupling approaches, the coupling agent can be applied as a first/early step, and the biotin coupling reaction can take place as a late/last step. One possible advantage of an intermediate coupling approach is with respect to scalability of the surface coating processes, since the coupling agents may be selected for compatibility with chemical vapor coating and robustness during subsequent process steps.

In some embodiments, the coating may include more than one component, with additional components added to improve the antifouling properties of the surface 414 at the bottom of the sample well 106. Additionally, in some embodiments, silane chemistry may be used to attach the coating(s) to the exposed $SiO_2$ surface. In one specific example, alkoxysilane chemistry may be used to obtain selective attachment to the $SiO_2$ surfaces relative to the metal oxide surfaces (e.g., $Al_2O_3$, $TiO_2$). Such coating(s) may be applied using liquid phase or vapor phase methods.

Figure 14:
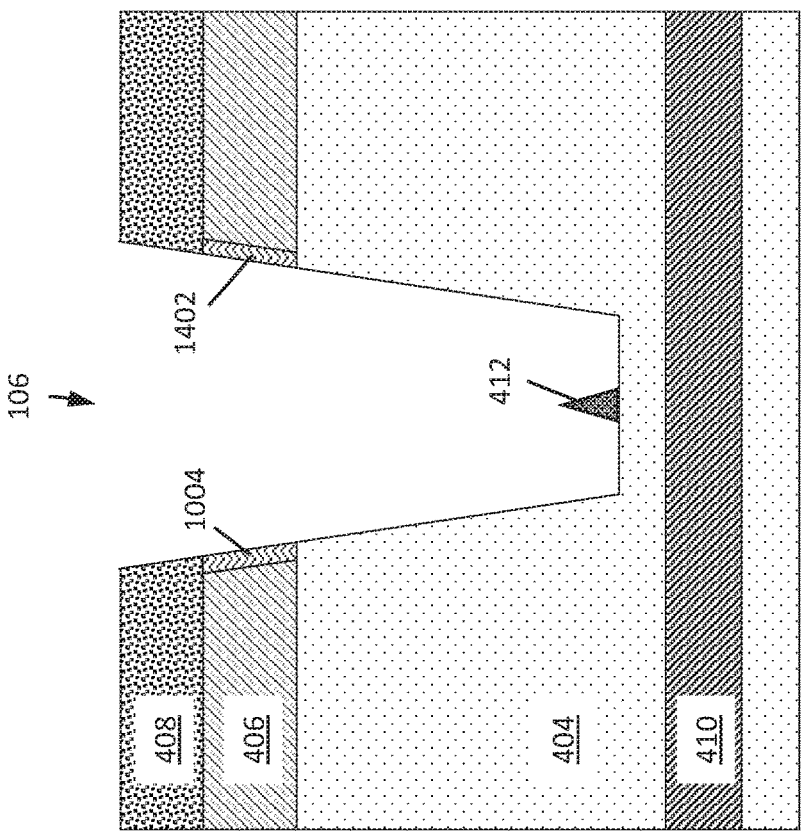

Although the silane material generally selectively forms on the bottom $SiO_2$ surface 414 of the sample well 106, this selectivity may not be ideal in that some of the functional material may weakly bond to the sidewall spacer material (e.g., $Al_2O_3$) 1202 and/or the top of the titanium nitride layer 408. Thus, the process 500 then proceeds to block 516 of FIG. 5 to remove the sacrificial sidewall spacers, as illustrated in FIG. 14. As shown, the biotin silinization function moiety 412 remains only on the bottom surface 414 of the sample well 106. The sacrificial spacer removal process advantageously selectively removes both any weakly bonded biotin silane on the top surface of layer 408, as well as the sidewall spacer material 1202 and any biotin silane attached thereto.

In embodiments where sidewall spacer material 1202 is $Al_2O_3$, an $Al_2O_3$ removal process is selected to be gentle enough so as to avoid causing chip corrosion yet strong enough to remove the sacrificial $Al_2O_3$ spacer 1202 inside the aperture and any biotin silane on surface. As previously indicated, the encapsulation spacers 1004 may protect sidewalls of the aluminum layer 406 during $Al_2O_3$ removal. Following removal of the sacrificial sidewall spacers, the process 500 proceeds to block 518 of FIG. 5 for an antifouling treatment of the structure. In the embodiment shown in FIG. 15, an antifouling silane film 1502, deposited by CVD for example, is formed. The film 1502 may be applied to a desired thickness for antifouling purposes, for example to about 1-20 nm. Because silane bonds to $SiO_2$ are relatively very stable (e.g., under sequencing conditions) with respect to silane bonds to $Al_2O_3$ (which are much less stable), an advantage of the approach is that the silane film on the exposed $SiO_2$ sidewall surface will have much higher stability than on an $Al_2O_3$ sidewall. Such stable coatings, in turn, may enable relatively long DNA reads (e.g., several hours). It should be appreciated, however that, an antifouling coating may alternatively be applied in other ways besides CVD.

One further potential benefit of the above embodiments (in addition to reduced processing time) may be the reduction of the likelihood of a "double attachment" which is suspected to be a factor affecting read length and sample loading from two polymerases on a looped DNA strand. With the above described process, only the biotin moiety located at the sample well bottom is available to attach to a strand. Still another potential benefit with respect to removing the $Al_2O_3$ sample well sidewall spacers may be an increase in signal to noise ratio.

The above-described embodiments can be implemented in any of numerous ways. For example, the embodiments may be implemented using hardware, software or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A method of forming an integrated device, the method comprising:
   forming a sample well within a cladding layer of a substrate;
   forming a sacrificial spacer layer over the substrate and into the sample well;
   performing a directional etch of the sacrificial spacer layer so as to form a sacrificial sidewall spacer on sidewalls of the sample well;
   forming, over the substrate and into the sample well, a functional layer that comprises at least one functional moiety and provides a location for attachment of a biomolecule, wherein functional material of the functional layer bonds to sacrificial spacer material of the sacrificial spacer layer; and
   after forming the functional layer, removing completely the sacrificial spacer material thereby removing the functional material bonded to the sacrificial spacer material, resulting in the functional layer disposed only on a bottom surface of the sample well.

2. The method of claim 1, wherein the sacrificial spacer layer comprises Al2O3.

3. The method of claim 1, wherein forming the sample well further comprises:
   forming a metal stack on the cladding layer of the substrate;
   forming an aperture in the metal stack;
   forming a conformal spacer layer over the metal stack and into the aperture;
   performing a directional etch of the conformal spacer layer so as to form protective sidewall spacers on an exposed sidewall of at least one metal layer of the metal stack; and
   etching into the cladding layer.

4. The method of claim 3, wherein the metal stack comprises at least one aluminum containing layer and at least one titanium containing layer.

5. The method of claim 3, wherein the conformal spacer layer is formed by plasma enhanced chemical vapor deposition (PECVD).

6. The method of claim 5, wherein the conformal spacer layer is selected from the group of: amorphous silicon (α-Si), SiO2, SiON, and SiN.

7. The method of claim 3, wherein the conformal spacer layer is formed by atomic layer deposition (ALD).

8. The method of claim 7, wherein the conformal spacer layer is selected from the group of: TiO2, Al2O3, SiO2, and HfO2.

9. The method of claim 1, wherein the functional layer comprises biotin functional sites for attachment of a streptavidin-labeled biomolecule.

10. The method of claim 1, wherein the functional layer comprises an intermediate coupling agent for subsequent attachment of a biotin functional site.

11. The method of claim 10, wherein the intermediate coupling agent comprises an alkyne coupling agent for attachment of a biotin-azide.

12. The method of claim 10, wherein the intermediate coupling agent comprises an isocyanate coupling agent for attachment of a biotin-thiol.

13. The method of claim 10, wherein the intermediate coupling agent comprises an epoxy coupling agent for attachment of a biotin-thiol.

14. The method of claim 1, wherein the functional layer is selected to facilitate biotin-silane bonding directly to material of the cladding layer.

15. The method of claim 1, wherein the functional layer comprises more than one component, with at least one component selected to provide antifouling properties for a bottom surface of the sample well.

16. The method of claim 1, further comprising using a silane chemistry to attach the functional layer to an exposed bottom surface of the sample well.

17. The method of claim 16, wherein the silane chemistry comprises an alkoxysilane chemistry configured to obtain selective attachment to SiO2 surfaces relative to metal oxide surfaces.

18. The method of claim 17, further comprising the functional layer using a liquid phase process.

19. The method of claim 17, further comprising the functional layer using a vapor phase process.

20. The method of claim 1, further comprising forming an antifouling film over the substrate and into the sample well.

21. An integrated device, comprising:
a cladding layer;
a metal stack formed on the cladding layer, the metal stack having a first metal layer and a second metal layer;
a sample well formed through the metal stack and into at least a portion of the cladding layer, the sample well having sidewalls and a bottom surface comprising a same material;
an encapsulating spacer material filling an undercut region of at least one of the first and second metal layers, wherein the sample well is completely free of any spacer material on all exposed surfaces of the sidewalls; and
a biotin functional moiety selectively formed only on the bottom surface of the sample well, wherein the biotin functional moiety is configured for attachment of a biomolecule thereto and the sample well is completely free of any functional material on all exposed surfaces of the sidewalls.

22. The device of claim 21, wherein the metal stack comprises at least one aluminum containing layer and at least one titanium containing layer.

23. The device of claim 21, wherein the encapsulating spacer material is selected from the group of: amorphous silicon (α-Si), SiO2, SiON, and SiN.

24. The device of claim 21, wherein the encapsulating spacer material is selected from the group of: TiO2, Al2O3, SiO2, and HfO2.

25. The device of claim 21, wherein the biotin functional moiety is configured for attachment of a streptavidin-labeled biomolecule.

26. The device of claim 21, wherein the biotin functional moiety comprises an intermediate coupling agent for subsequent attachment of a biotin functional site.

27. The device of claim 26, wherein the intermediate coupling agent comprises an alkyne coupling agent for attachment of a biotin-azide.

28. The device of claim 26, wherein the intermediate coupling agent comprises an isocyanate coupling agent for attachment of a biotin-thiol.

29. The device of claim 26, wherein the intermediate coupling agent comprises an epoxy coupling agent for attachment of a biotin-thiol.

30. The device of claim 21, wherein the biotin functional moiety is bonded directly to material of the cladding layer.

31. The device of claim 21, wherein a functional layer used to form the biotin functional moiety comprises more than one component, with at least one component selected to provide antifouling properties for the bottom surface of the sample well.

32. The device of claim 21, further comprising an antifouling film formed over the substrate and into the sample well.

* * * * *